(12) United States Patent
Anderson et al.

(10) Patent No.: US 7,124,367 B2
(45) Date of Patent: Oct. 17, 2006

(54) ADJUSTABLE USER INTERFACE

(75) Inventors: Glen J. Anderson, Sioux City, IA (US); Russell F. McKnight, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 512 days.

(21) Appl. No.: 10/076,232

(22) Filed: Feb. 14, 2002

(65) Prior Publication Data

US 2003/0090517 A1 May 15, 2003

Related U.S. Application Data

(63) Continuation-in-part of application No. 09/993,972, filed on Nov. 14, 2001, now abandoned.

(51) Int. Cl.
G06F 3/14 (2006.01)
G06F 13/00 (2006.01)

(52) U.S. Cl. ............... 715/735; 715/966; 715/717; 715/771; 710/18; 710/15

(58) Field of Classification Search ........... 345/760, 345/745, 758; 715/735, 734, 736, 760, 745, 715/758, 966, 716, 717, 771, 772, 719, 723, 715/765, 866, 764; 710/8, 15, 18, 19, 73, 710/220

See application file for complete search history.

(56) References Cited

U.S. PATENT DOCUMENTS

| 5,706,455 A | 1/1998 | Benton et al. ............. 395/348 |
|---|---|---|
| 5,793,366 A * | 8/1998 | Mano et al. ................ 345/839 |
| 5,956,487 A | 9/1999 | Venkatraman et al. .. 395/200.48 |
| 6,032,202 A | 2/2000 | Lea et al. ...................... 710/8 |
| 6,067,628 A * | 5/2000 | Krithivas et al. ........... 713/340 |
| 6,072,490 A | 6/2000 | Bates et al. ................. 345/347 |
| 6,098,116 A | 8/2000 | Nixon et al. ................... 710/8 |
| 6,134,615 A | 10/2000 | Chari et al. ................ 710/103 |
| 6,252,597 B1 | 6/2001 | Lokuge ..................... 345/353 |
| 6,384,925 B1 * | 5/2002 | Fujiyoshi .................. 358/1.15 |
| 6,466,434 B1 * | 10/2002 | Tsai ...................... 710/100 X |
| 6,493,770 B1 * | 12/2002 | Sartore et al. ................ 710/8 |
| 6,748,367 B1 * | 6/2004 | Lee ............................. 705/66 |

* cited by examiner

*Primary Examiner*—Raymond J. Bayerl
(74) *Attorney, Agent, or Firm*—Ross F. Hunt, Jr.; Stites & Harbison PLLC

(57) ABSTRACT

The present invention is directed to an adjustable user interface. A method of configuring a user interface of an information handling system based on utilization of ports included with the information handling system may include monitoring a plurality of ports included on the information handling system. Utilization by a device of a port of the plurality of ports is monitored, the device communicatively coupled to at least one port of the plurality of ports. A user-interface operating on the information handling system is configured based on the determined utilization by the device of the port of the plurality of ports.

26 Claims, 11 Drawing Sheets

ADJUSTABLE USER INTERFACE

CROSS REFERENCE TO RELATED APPLICATIONS

The present application is a continuation-in-part of U.S. patent application Ser. No. 09/993,972, filed Nov. 14, 2001, now abandoned, which is herein incorporated by reference in its entirety.

FIELD OF THE INVENTION

The present invention generally relates to the field of user interfaces as provided in electronic environments, and particularly to an adjustable user interface.

BACKGROUND OF THE INVENTION

With the proliferation of electronic devices, users have access to a wide range of functionality. From digital cameras and camcorders, to digital music players, digital video disc players, the Internet, and the like, users may access content from a wide variety of sources. However, these sources may not be readily combinable and accessible by a user in an efficient manner.

Media-editing programs are typically created for a given media type, such as photo-editing software for electronic photos, video-editing program for digital video, and the like, and are typically ill-suited for the inclusion of content types not specifically designed for by the system. Although the media-editing program in some instances may import other media types, the manipulation of the imported content may have undesirable results.

For example, a user may wish to combine video from a home movie and audio from an audio source, such as from a network connection over the Internet. Further, the user may wish to also combine still photos from a digital camera into an integrated viewing and listening experience. Accessing the content from these various systems and sources may be difficult to perform in a unified manner. For instance, a user may need to access a browser, access software provided by the digital camera to obtain the content, as well as access a digital videodisc player. Additionally, the importation of content may result in changing the content from its previously desired state. Thus, the user must progress through a multi-step process to even access the content, much less manipulate the content in a desired manner.

Further, previous interfaces do not provide access to the content in an intuitive manner, and may require the user to navigate through various screens to access desired manipulation tools, and the like. This is especially true in instances when a media type is imported into a program that was not designed to access the content.

SUMMARY OF THE INVENTION

Accordingly, the present invention is directed to an adjustable user interface. In a first aspect of the present invention, a method of configuring a user interface of an information handling system based on utilization of ports included with the information handling system includes monitoring a plurality of ports included on the information handling system. Utilization by a device of a port of the plurality of ports is monitored, the device communicatively coupled to at least one port of the plurality of ports. A user-interface operating on the information handling system is configured based on the determined utilization by the device of the port of the plurality of ports.

In a second aspect of the present invention, a method of configuring a user interface of an information handling system based on utilization of ports included with the information handling system includes monitoring a plurality of ports included on the information handling system. Utilization by a first device communicatively coupled to a first port and a second device communicatively coupled to a second port of the plurality of ports is determined. A display of a user-interface operating on the information handling system is configured based on the determined utilization of the first port and the second port of the plurality of ports. Configuring may include arranging the user-interface so that content corresponding to the first device and content corresponding to the second device is displayed based upon the ports utilized by the first device and the second device.

In a third aspect of the present invention, an information handling system includes a plurality of ports, a memory, a display device and a processor. The plurality of ports is suitable for communicatively coupling the information handling system to a device. The memory is suitable for storing a program of instructions, the display device is suitable for outputting a display of information and the processor is suitable for performing a program of instructions. The processor is communicatively coupled to the plurality of ports, the memory and the display device. The program of instruction configures the processor to monitor the plurality of ports so that utilization of the ports by devices is employed to cause the processor to configure a display of a user interface so that content corresponding to each of the devices is arranged based upon which of the ports is utilized by the devices.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 10, embodiments of the present invention are shown. Users often wish to create various media outputs based on many different types of inputs. For instance, a user may wish to combine streaming video with video stills and audio data to create a unified interactive experience. The present invention provides a user interface that may be changed based upon detection and operation of peripheral devices and relevant applications to provide a targeted control mechanism to enable a user to interact with various media types in a unified manner. For instance, the present invention may provide a graphical user interface that would change based upon connected output devices, connected input devices and available programs, optimize based on the utilization of ports by devices, and the like as contemplated by a person of ordinary skill in the art.

Figure 1:
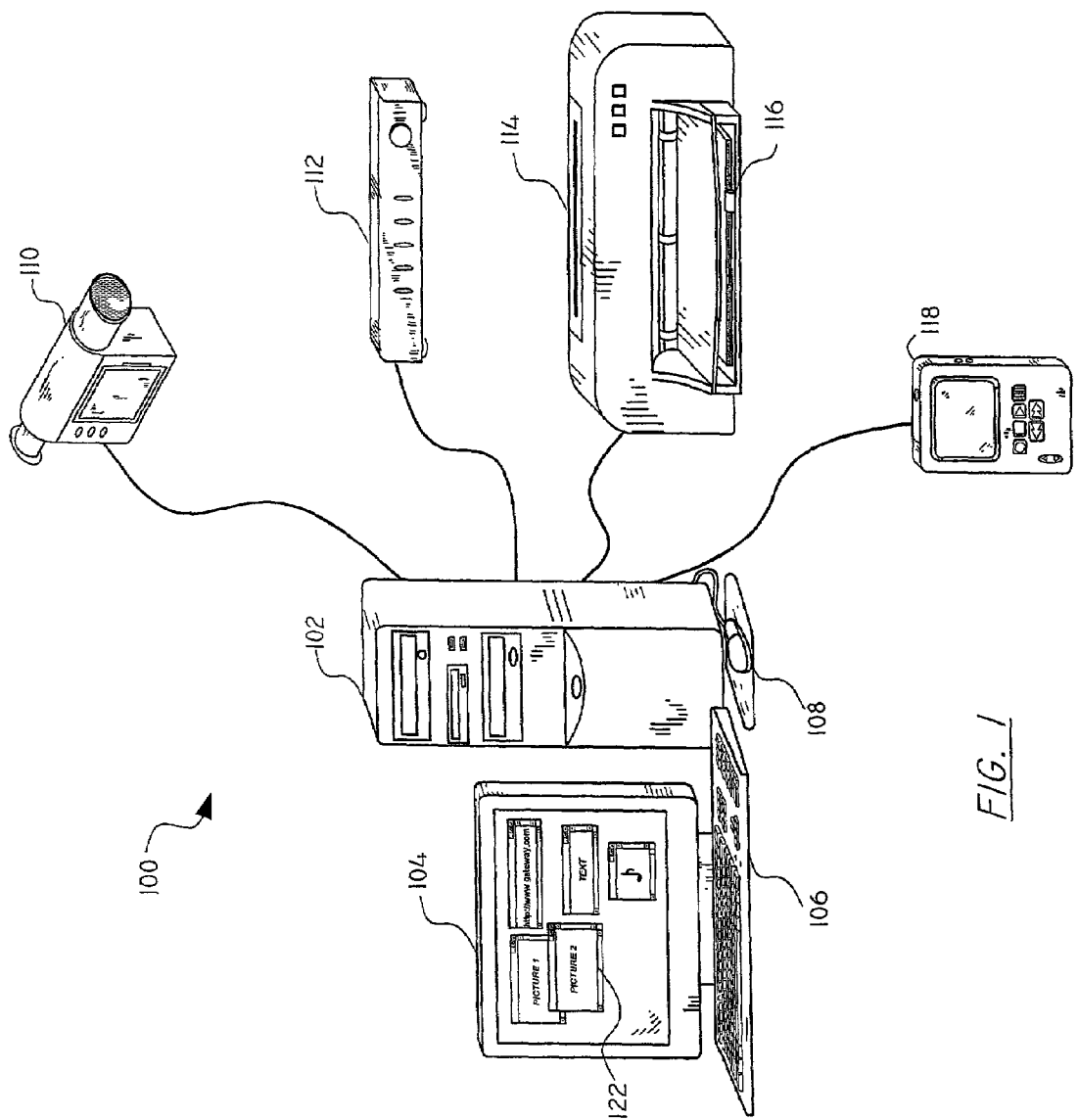
FIG. 1 is an illustration of an embodiment of the present invention wherein an information handling system coupled to a variety of devices is shown.
Figure 2:
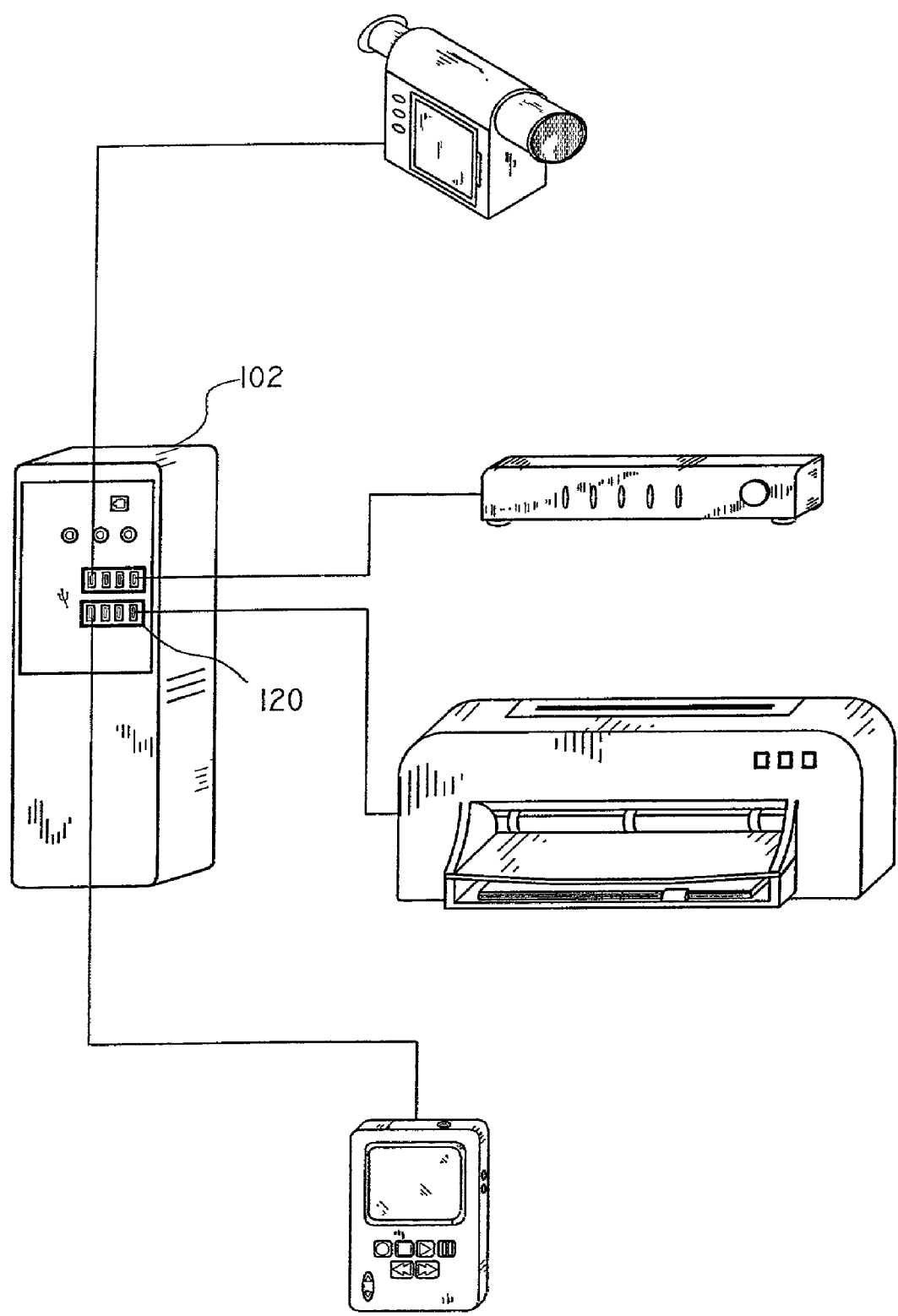
FIG. 2 is an illustration of the information handling system as shown in FIG. 1 in which a rear view of a chassis of an information handling system is shown.

Referring now to FIGS. 1 and 2, an embodiment of the present invention is shown wherein an information handling system is coupled to a plurality of devices that utilize ports available on the information handling system. An information handling system 100 includes a chassis 102 for housing internal components of the information handling system 100 as well as internal devices, such as hard disk drives, removable media drives such as CD-ROMs, DVD players, floppy disk drives, and the like. The information handling system has a display device for displaying information for interaction by a user, such as through the use of a keyboard 106 and mouse 108.

A user may also access electronic devices to obtain additional functionality. For example, an information handling system 100 may access a digital video recorder 110 to obtain video and audio data and a network connection device 112 to obtain content, such as a router, modem, cable modem, wireless communication device, and the like, to access a network, such as a local area network (LAN), wide area network (WAN), and the Internet. Additionally, a user may utilize a scanner 114 to obtain an image of a document, may print images utilizing a printer 116, and may access information from a personal digital assistant 118. Thus, a user may access functionality from a wide variety of devices.

To access this functionality, ports 120 are provided on the chassis 102 of the information handling system 100 to connect the information handling system 100 to the devices, such as USB, IEEE 1394, parallel, Fibre channel, and the like. Because of the desire by users to access a multiplicity of devices at a given time, a plurality of ports may be provided. In an embodiment of the present invention, the particular port to which a device is attached may be utilized to configure a user interface 122 based on the port usage. For instance, a relationship may be defined between ports, and that relationship utilized to configure a user interface displaying data from devices utilizing those ports in the stored relationship.

Figure 3:
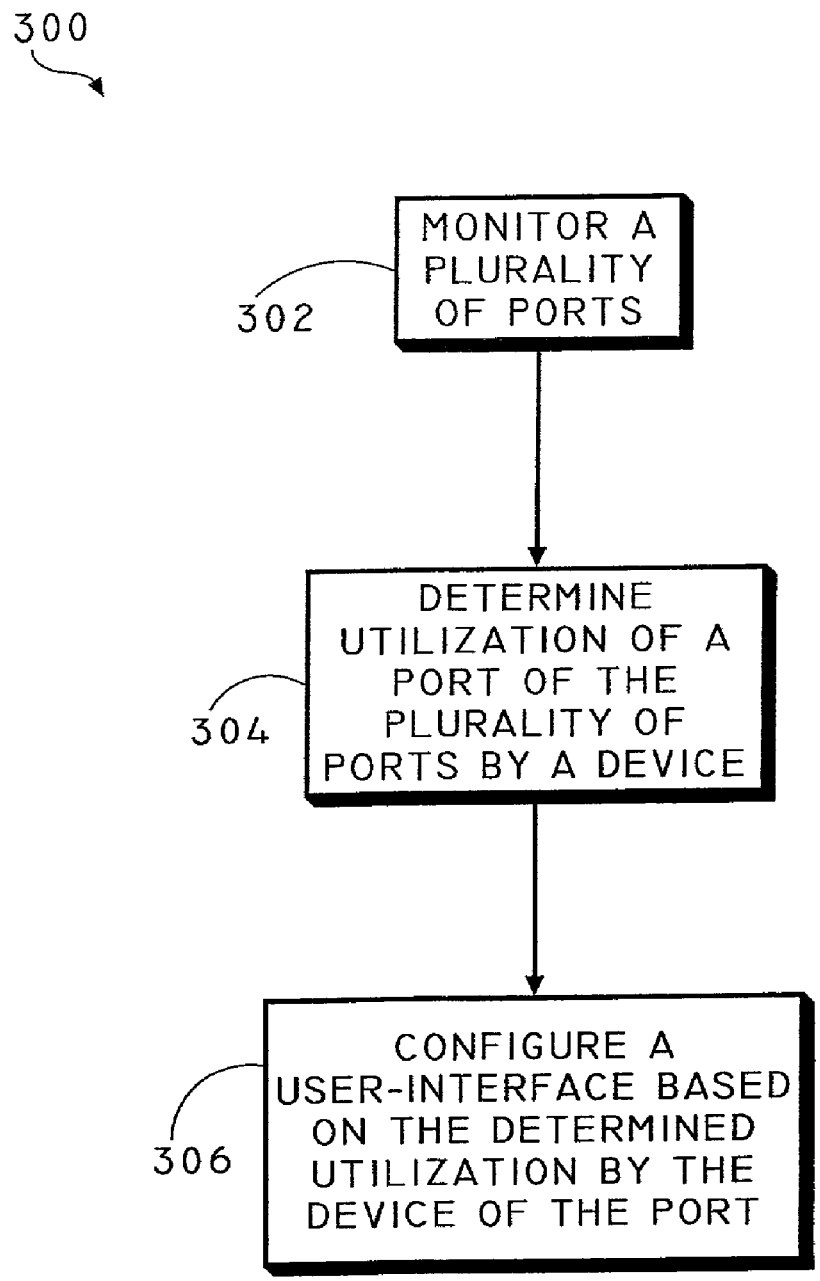
FIG. 3 is a flow diagram depicting an exemplary method of the present invention wherein a user interface is configured based on utilization of ports of an information handling system.

Referring now to FIG. 3, an exemplary method 300 of the present invention is shown wherein utilization of ports by devices is employed to configure a user interface. An information handling system includes a plurality of ports, such as the information handling system described in FIG. 1, for enabling the information handling system to access the functionality of a device. The information handling system monitors the plurality of ports 302, and determines utilization of a port by a device 304. For example, the information handling system may identify which particular port is being utilized, as well as the device utilizing the port, such as the functionality of the device, the type of device, identity of the device, and the like. The information handling system may then configure a user-interface based on the determined utilization of the port by the device 306. For example, a user interface may be arranged based on the detected devices, based on which port the devices are connected, and the like.

In this way, the user interface may be configured in a manner corresponding to port usage by a user, and thus may provide a more intuitive interface for interaction with the variety of connected devices. For instance, a user may connect devices to an information handling system in an arrangement that would indicate the importance of the devices to the user. A user may, for example, place devices in order of importance to the user when connecting the devices to ports that are numbered consecutively. Oftentimes, the user may not even be consciously aware of such an arrangement, but may do so instinctively when confronted with the port numbering. In this way, the user interface may be configured to place higher priority devices, and their corresponding content and information, in a more readily accessibly location on a display of information by a display device. A variety of other methods may also be employed for utilizing port placement as contemplated by a person of ordinary skill in the art without departing from the spirit and scope of the present invention.

Figure 4:
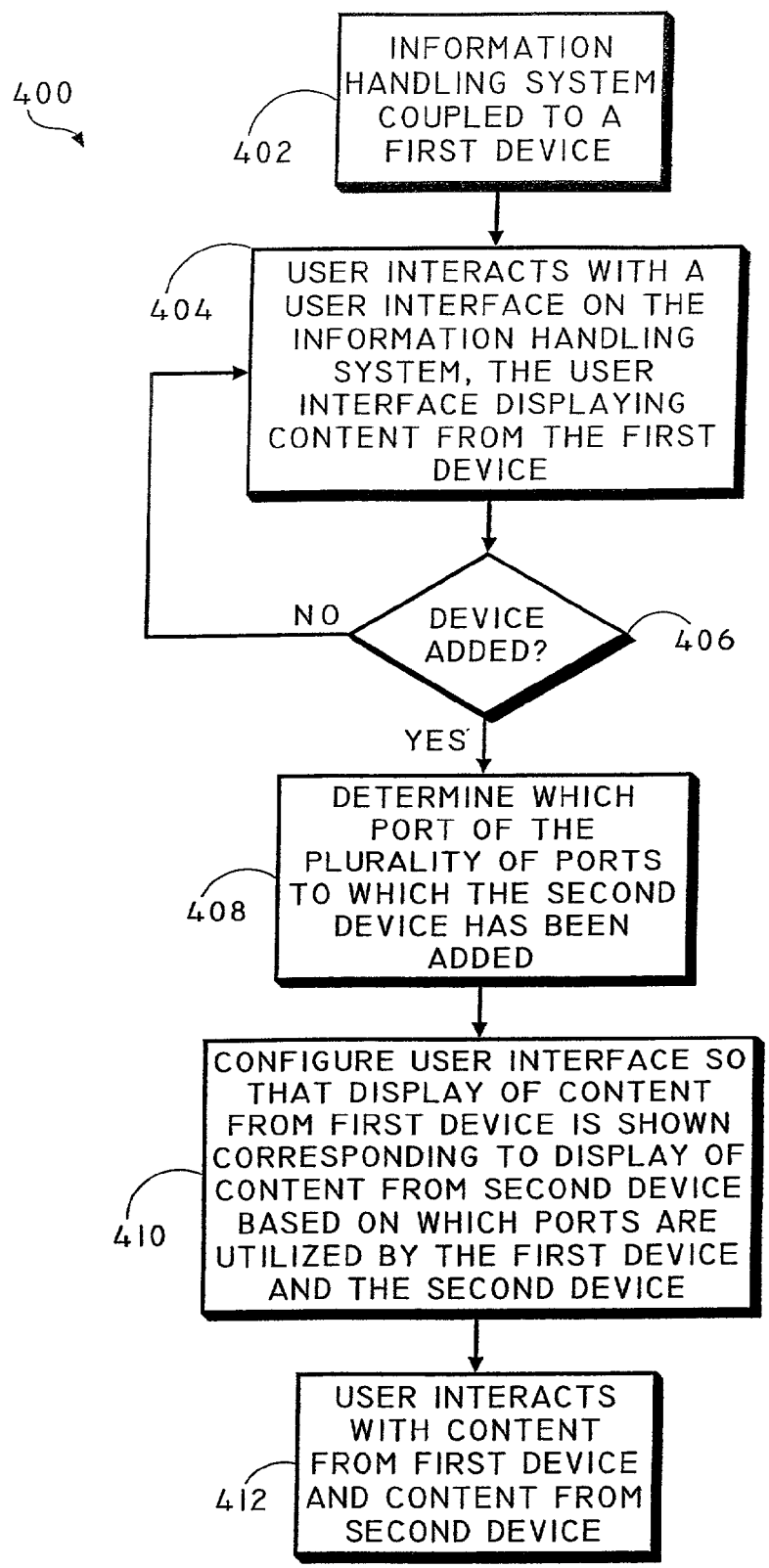
FIG. 4 is a flow diagram illustrating an exemplary method of the present invention wherein multiple devices accessing multiple ports of an information handling system are utilized to configure a user interface.
Figure 5:
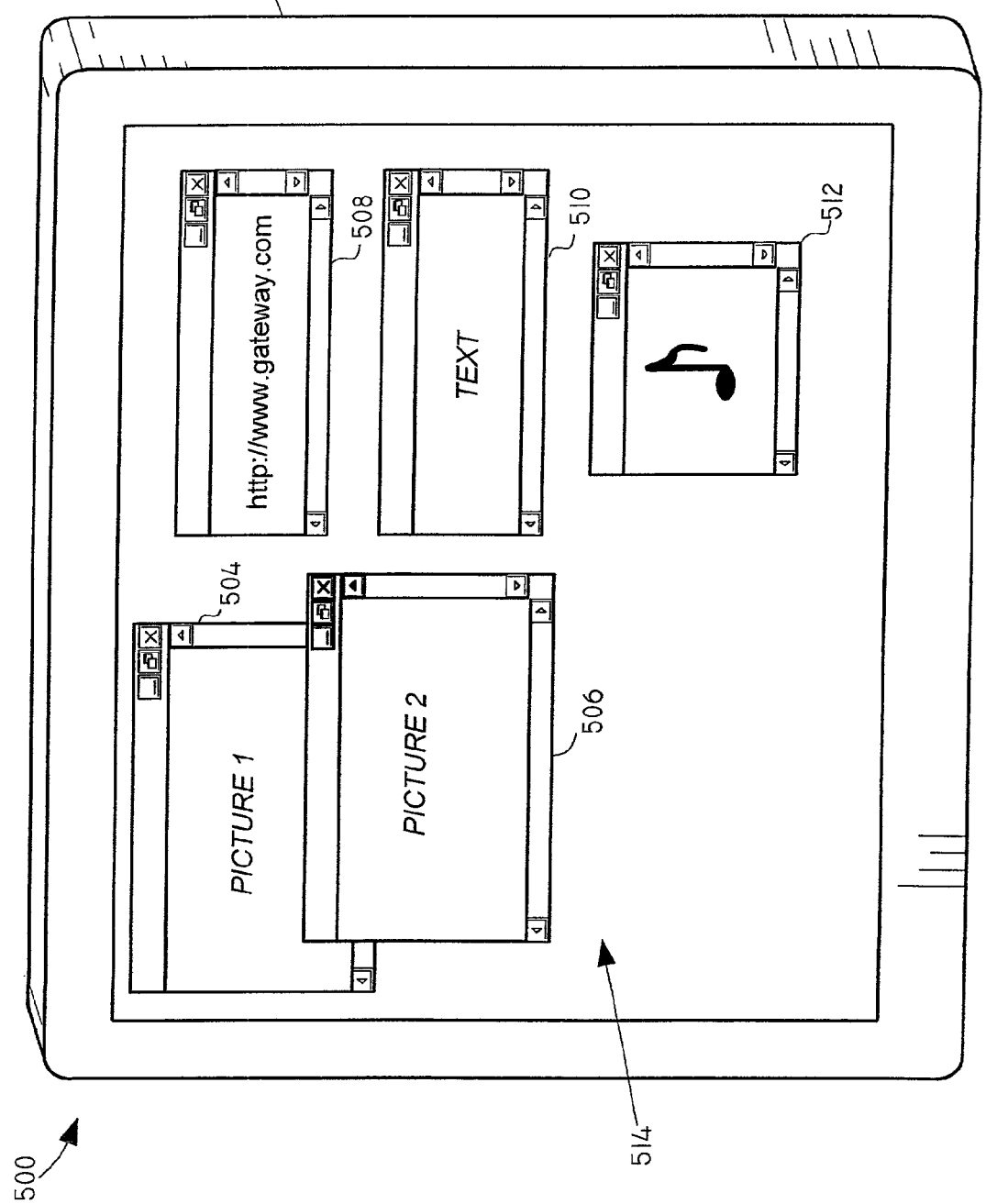
FIG. 5 is an illustration of an embodiment of the present invention wherein a user interface having data obtained from devices communicatively coupled to an information handling system is shown.

Referring now to FIG. 4, an exemplary method 400 of the present invention is shown wherein multiple devices accessing multiple ports of an information handling system are utilized to configure a user interface. An information handling system is coupled to a first device 402 through use of a first port. A user interacts with a user interface, output by the information handing system, which displays content corresponding to the first device 404. If a second device is added 406, the information handling system determines which port of the plurality of ports included on the information handling system the second device has been added 408. The user interface is then configured so that a display of content from the first device is shown corresponding to display of content from a second device based on which ports are utilized by the first device and the second device 410. Thus, a user may interact with content from the first device and content from the second device 412, the content displayed in a manner corresponding to port usage.

Figure 9:
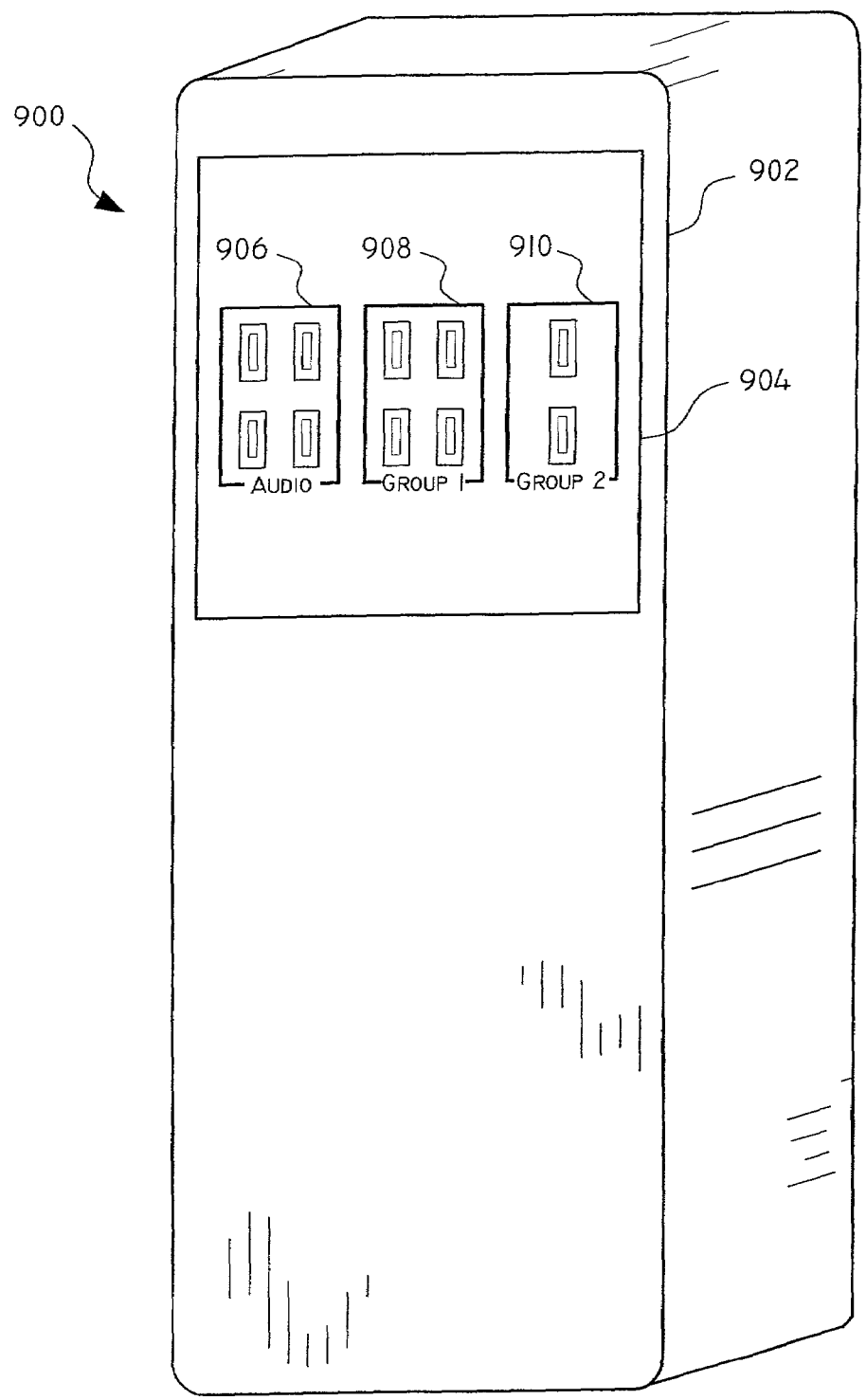
FIG. 9 is an illustration of an embodiment of the present invention wherein devices connected in groups to an information handling system are utilized to configured a user-interface based on the groupings.

For example, as shown in FIG. 2, a plurality of ports may be provided on an information handling system. The information handling system may define a relationship between the ports so that devices connected to the ports have information corresponding to the devices displayed on a display device corresponding to the defined relationship of the ports. For example, if multiple rows of ports were provided as shown in FIG. 9, if one device were plugged in to the left of another device, the corresponding content of that device may appear to the left and/or adjacent on a user interface. Likewise, if one device was plugged in directly above another device on the information handling system, that device's content may appear above the content from the device below it. Further, the display of information may be ordered to correspond to the order of the device as utilizing the ports.

Such configurations may be particularly useful in providing a default implementation of a user interface so as to supply an initial user interface configuration. Thus, a user may be provided with an initial display corresponding to device attachment to the information handling system, and may then allow the user to make changes to the configuration as desired.

In this way, a user interface may be configured based on devices connected to particular ports of an information handling system. For example, referring now to FIG. 5, an embodiment 500 of the present invention is shown wherein a user interface 514 is provided to enable a user to interact with information from a variety of devices communicatively connected to the information handling system. A display device 502 includes a plurality of windows having content as obtained from devices, such as the devices shown in FIGS. 1 & 2. For instance, pictures may be obtained from a digital camera and digital camcorder and have the corresponding content displayed in windows 504 and 506. Additionally, a network connection device may provide data from a network connection, and have that data displayed in a window 508 on a display device. Likewise, an application operating on the information handling may provide a text-entry screen 510, such as by a word processor, spreadsheet program, and the like, to enable a user to enter and manipulate text 510. A user may also access music from a music-playing device in another window 512.

Thus, pluralities of windows in a user interface are provided to enable a user to interact with content from a variety of sources. By utilizing the present invention, in an embodiment, the windows may be arranged based upon connected output devices, connected input devices and available programs, optimized based on the utilization of ports by devices, and the like as contemplated by a person of ordinary skill in the art.

Figure 6:
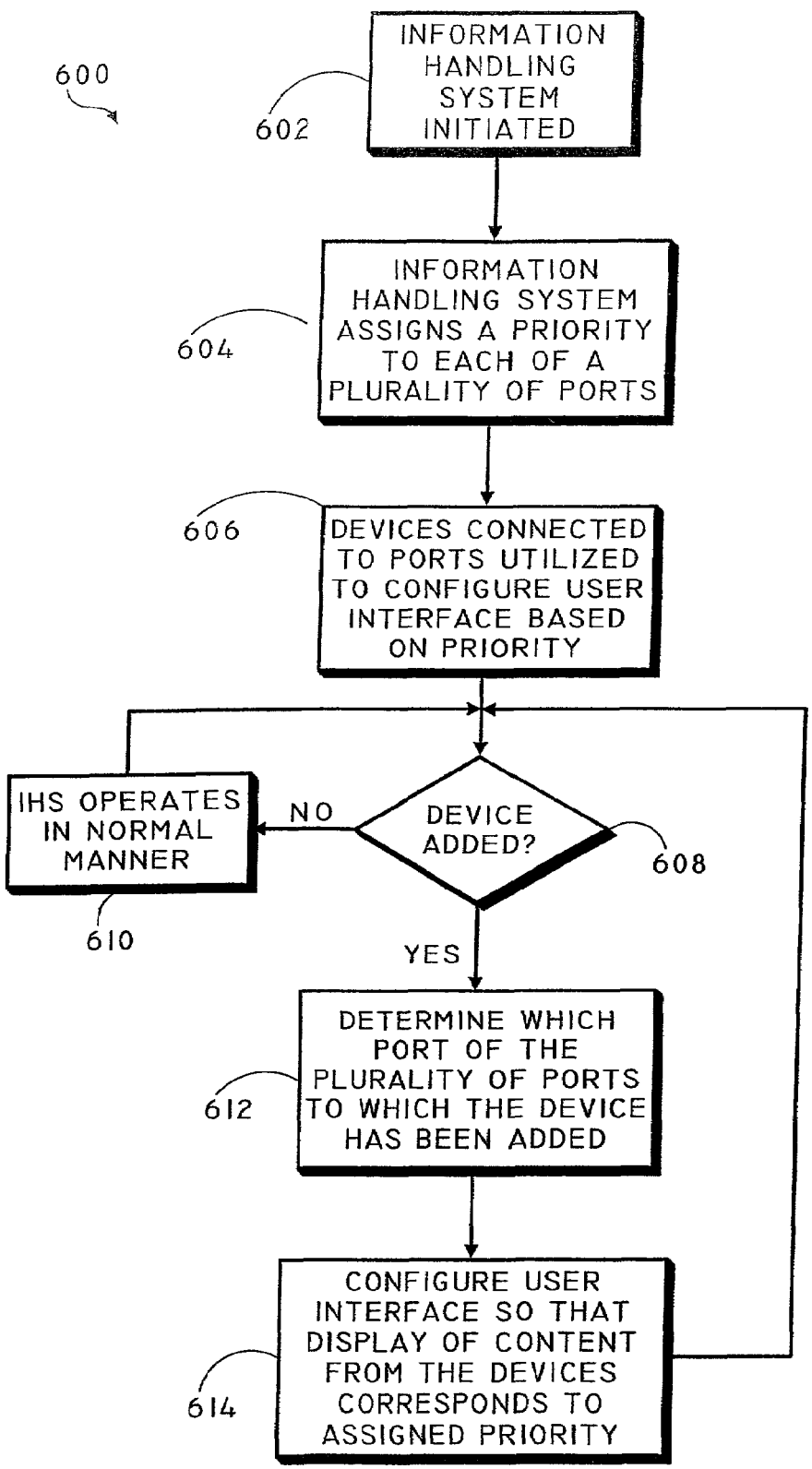
FIG. 6 is a flow diagram illustrating an exemplary method of the present invention wherein a priority of ports on an information handling system is utilized to configure a user interface including information from devices communicatively connected to the ports.

Referring now to FIG. 6, an exemplary method 600 of the present invention is shown wherein a priority of ports on an information handling system is utilized to configure a user interface including information from devices communicatively connected to the ports. An information handling system is initiated 602. The information handling system assigns a priority to each of a plurality of ports included on the information handling system 604 at start-up. For instance, a priority may be determined based on user tendencies when confronted with a particular port configuration, past usage of the ports, and the like as contemplated by a person of ordinary skill in the art. The devices connected to the ports are utilized to configure the user interface based on the assigned priority 606.

If no other devices are added during operation 608, the information handling system operates in a normal manner 610. However, if a device is added 608, the information handling system determines which port of the plurality of port the device has been added 612. The user interface is then configured so that the display of content from the devices corresponds to the assigned priority 614. In an additional embodiment of the present invention, the information handling system may assign even greater priority to more recently added devices.

Figure 7A:
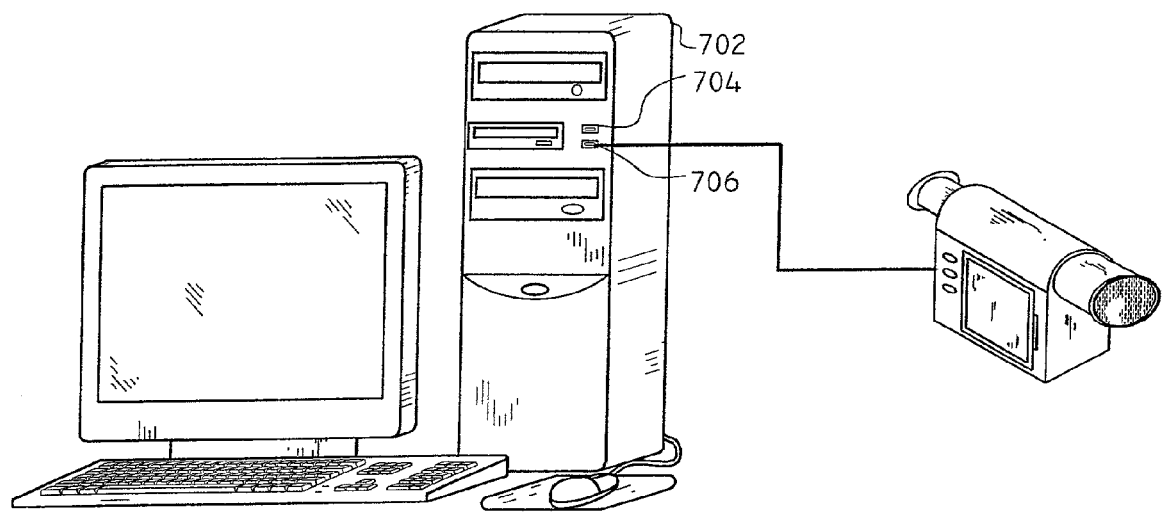
FIGS. 7A and 7B are illustrating an information handling system having ports disposed on multiple surfaces of the information handling system.
Figure 7B:
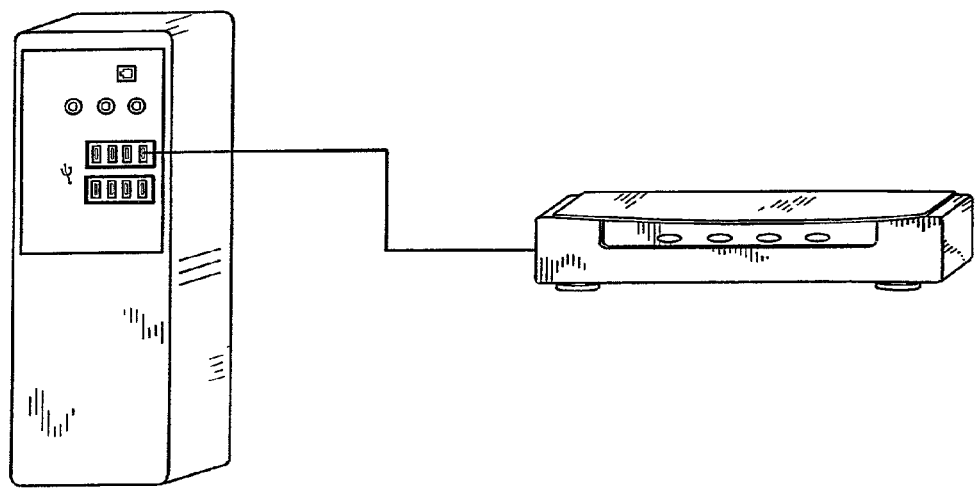

Referring now to FIGS. 7A and 7B, an exemplary embodiment of the present invention is shown wherein an information handling system chassis includes ports accessible on different surfaces and orientations. Ports may be positioned in a variety of places on an information handling system to provide accessibility from a variety of orientations. For instance, as shown in FIG. 7A, an information handling system chassis 702 includes a first port 704 and a second port 706 positioned on the front portion of the chassis 702. By positioning ports 704 & 706 on the front of the chassis 702, a user may easily connect devices to the information handling system without requiring the user to access the back portion of the chassis 702, as shown in FIG. 7B. Thus, mobile devices that are connected to and disconnected from the information handling system may be attached in an efficient manner without requiring a user to move the chassis from what may be a generally inaccessible location.

Positioning ports on the rear portion of the chassis may also be beneficial, as shown in FIG. 7B. For instance, ports positioned on a rear portion of a device may be preferable to a user when connecting devices which are not removed and reconnected from the device, such as printers, scanners, network connection devices, and the like. Thus, cords utilized for connecting the device to the information handling system would not interfere with the front of the information handling system, and would not clutter the area around the system. The present invention may utilize these various reasons for connecting a device to different ports in different orientations to configure a user interface in a desired manner.

Figure 8A:
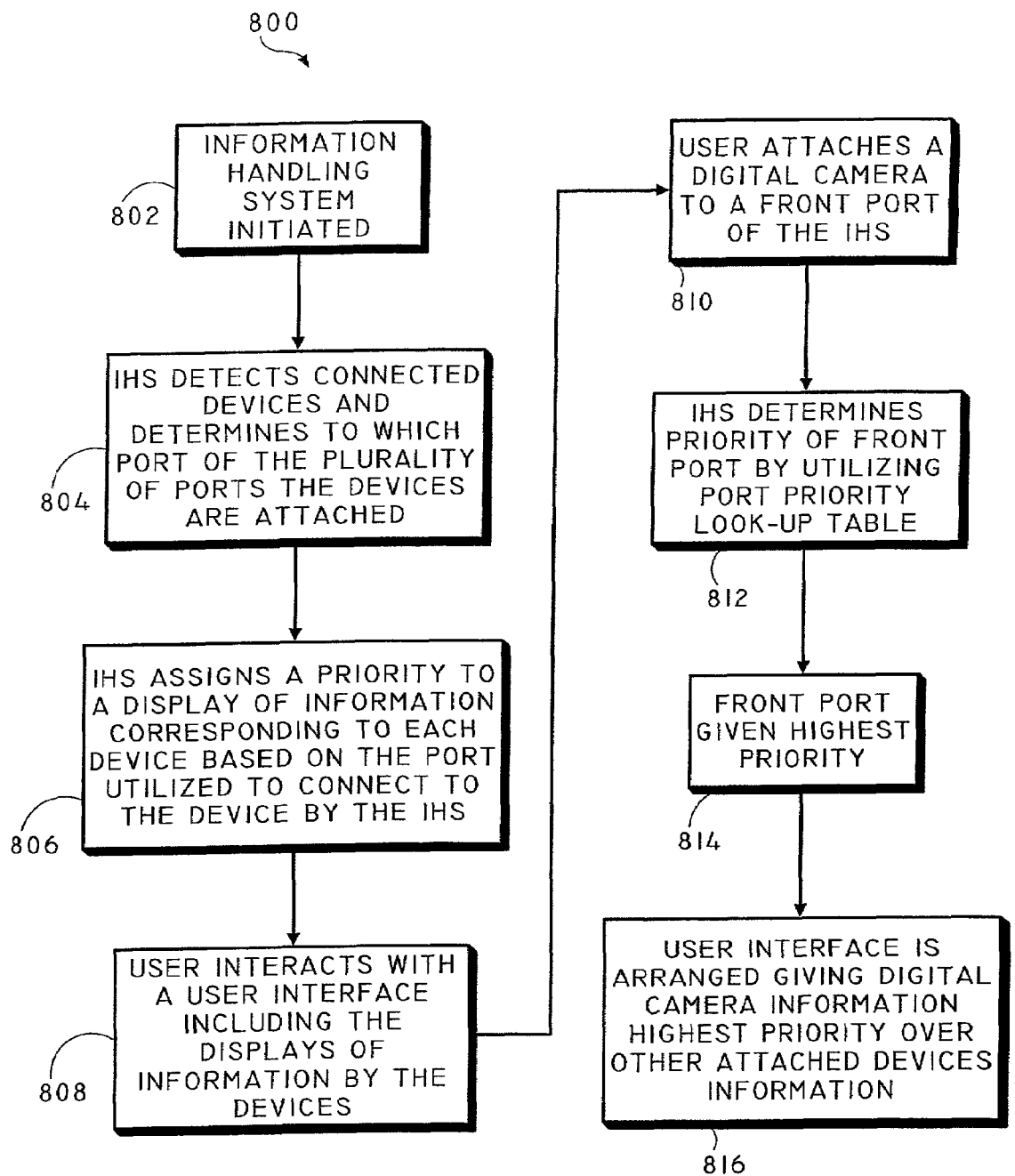
FIG. 8A is a flow diagram depicting an exemplary method of the present invention wherein priority based on accessibility of a port on an information handling system is utilized to configure a user interface.

For example, referring now to FIG. 8A, an exemplary method 800 of the present invention is shown wherein priority based on accessibility of a port on an information handling system is utilized to configure a user interface. An information handling system is initiated 802. The information handling system detects connected devices and determines which port of the plurality of ports available on the information handling system the devices are attached 804. The information handling system assigns a priority to a display of information corresponding to each device based on the port utilized to connect to the device by the information handling system 806, and thus enables a user to interact with a user interface including displays of information by the devices 808. For instance, a user may have a collection of devices, such as a printer, scanner, network connection device, and the like, connected to the rear portion of a chassis of the information handling system which may indicate the desired general availability of those devices by the user, and thus may be given similar priority.

The user may then attach a digital camera to a front port of the information handling system 810. Because of the recent connection of the device, as well as the connection of the device to the front port of the information handling system, the information handling system may assign priority, may determine priority of the front by utilizing a port priority look-up table 812, and the like. Thus, by utilizing both the temporal and positional aspects of the user's connection of the device to the information handling system, the information handling system may give the front port the highest priority 812, and arrange the user interface to give the digital camera information higher priority than corresponding information from other attached devices 816.

Figure 8B:
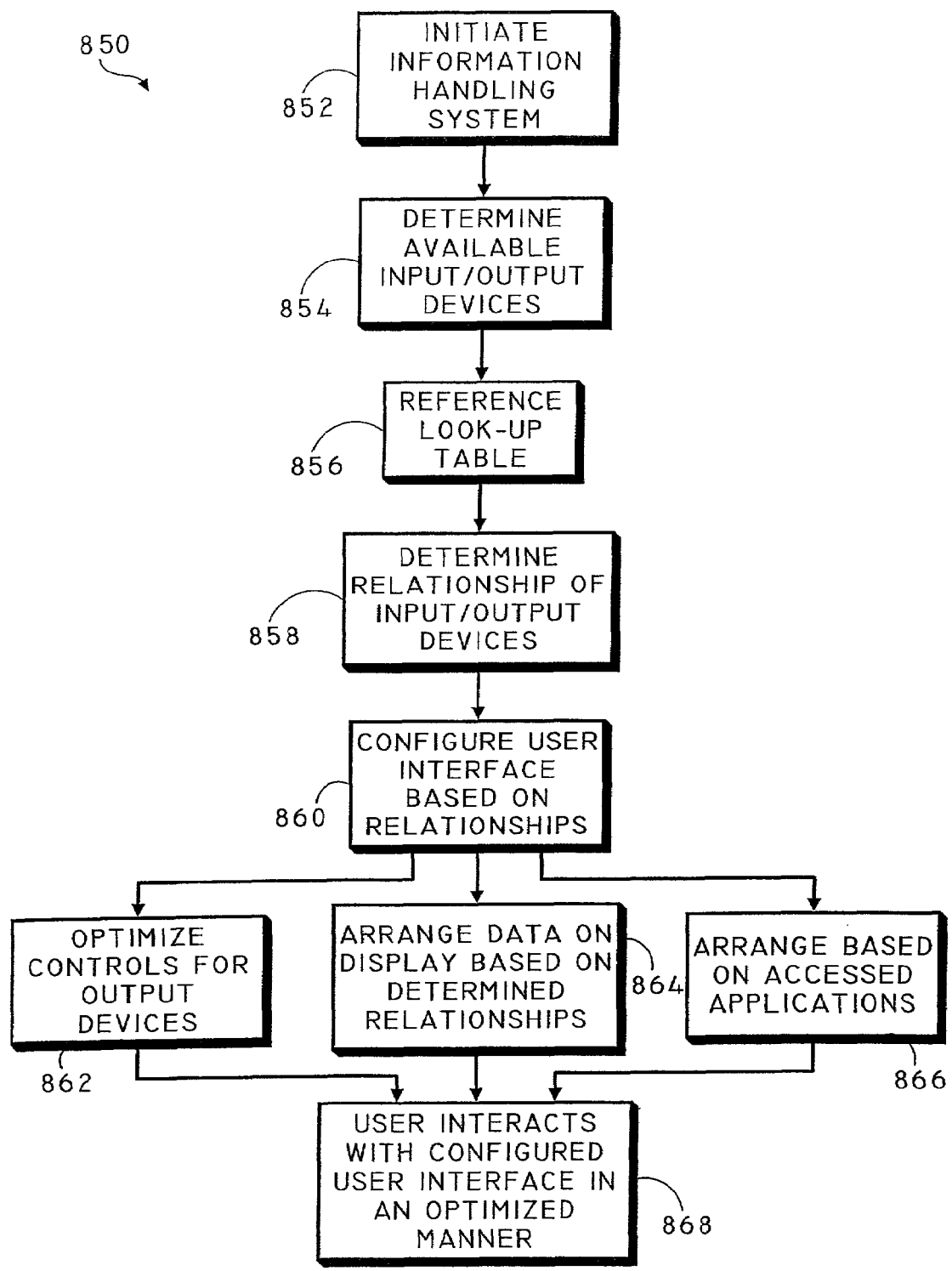
FIG. 8B is a flow diagram illustrating an exemplary method of the present invention wherein a user interface is optimized by output devices as well as input devices available to an information handling system.

Referring now to FIG. 8B, an exemplary method 850 of the present invention is shown wherein a user interface is optimized by output devices as well as input devices available to an information handling system. The present invention may also employ knowledge of detected output devices in order to configure a user interface. For example, an information handling system may be initiated 852 and determine available input and output devices 854, such as printers, and the like. The information handling system references a look-up table 856 to determine a relationship of the input/output devices 858, such as the devices most utilized and therefore a corresponding priority based on heuristic data, combinations of devices most desired, and the like.

The user interface may then be configured based on the relationships 860, such as by optimizing controls for output devices 862, arranging data on a display device based on determined relationships 864, arrange based on accessed application 866, most typically accessed applications, and the like, as well as other methods as contemplated by a person of ordinary skill in the art. Thus, the user may interact with a configured user interface in an optimized manner 868.

Referring now to FIG. 9, an embodiment 900 of the present invention is shown wherein devices connected in groups to an information handling system are utilized to configured a user-interface based on the groupings. Groupings may also be provided so that a user interface may be configured based on the groupings. For instance, an audio device grouping 906 of a plurality of ports 904 may be provided by an information handling system 902 so that a user interface may be configured to display windows corresponding to devices connected within that grouping, such as by displaying windows corresponding to the devices in a closer proximity than to other windows, arranged within an area displayed on a display device, and the like as contemplated by a person of ordinary skill in the art.

Additionally, generic groupings may be provided so that a user may choose a relationship between devices as configuring a user interface based on how the devices are connected. For instance, groupings 908 & 910 may be indicated by indications provided by an information handling system. Further, groupings may be determined dynamically by an information handling system, such as indicated by empty port spaces betweens groups of devices, detected based on an order of device connection to an information handling system, and the like without departing from the spirit and scope of the present invention.

Figure 10:
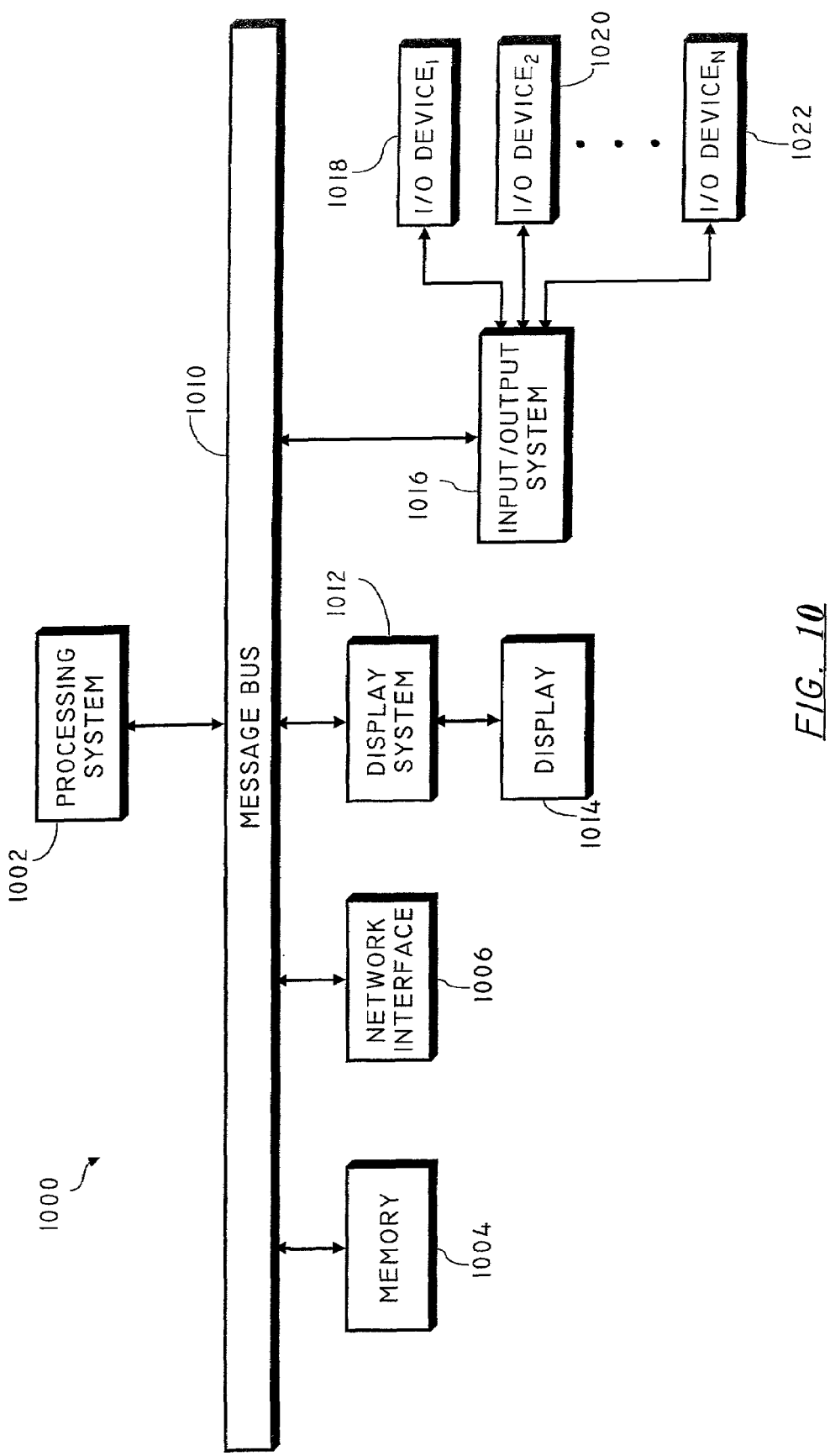
FIG. 10 is a block diagram of an exemplary information handling system operable to employ the present invention.

Referring now to FIG. 10, a hardware system in accordance with the present invention is shown. The hardware system shown in FIG. 10 is generally representative of the hardware architecture of an information handling system of the present invention. An information handling system may include a digital information appliance, convergence system, Internet appliance, and the like without departing from the spirit and scope of the present invention. A controller, for example, a processing system 1002, controls the information handling system 1000. The processing system 1002 includes a central processing unit such as a microprocessor or microcontroller for executing programs, performing data manipulations and controlling the tasks of the information handling system 1000. Communication with the processing system 1002 may be implemented through a system bus 1010 for transferring information among the components of the information handling system 1000.

The system bus 1010 may include a data channel for facilitating information transfer between storage and other peripheral components of the information handling system 1000. The system bus 1010 further provides the set of signals required for communication with processing system 1002 including a data bus, address bus, and control bus. The system bus 1010 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 10100 may be compliant with any promulgated industry standard. For example, the system bus 1010 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE 1394, Apple Desktop Bus (ADB), Concentration Highway Interface (CHI), Fire Wire, Geo Port, or Small Computer Systems Interface (SCSI), for example.

Additionally, the information handling system 1000 includes a memory 1004. In one embodiment, memory 1004 is provided on SIMMs (Single In-line Memory Modules), while in another embodiment, memory 1004 is provided on DIMMs (Dual In-line Memory Modules), each of which plugs into suitable sockets provided on a motherboard holding many of the other components shown in FIG. 10. Memory 1004 includes standard DRAM (Dynamic Random-Access Memory), EDO (Extended Data Out) DRAM, SDRAM (Synchronous DRAM), or other suitable memory technology. Memory 1004 may also include auxiliary memory to provide storage of instructions and data that are loaded into the memory 1004 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The information handling system 1000 may further include a network connection device 1006. The network connection device 1006 communicates between the information handling system 1000 and a remote device, such as external devices, networks, information sources, or host systems that administer a plurality of information handling systems. For example, host systems such as a server or information handling system, may run software controlling the information handling system, serve as storage for an information handling system, or coordinate software running separately on each information handling system.

The network connection device 1006 may provide or receive analog, digital, or radio frequency data. The network connection device 1006 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network connection device 1006 may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The information handling system 1000 further includes a display system 1012 for connecting to a display device 1014. The display system 1012 may comprise a video display adapter having all of the components for driving the display device, including video random access memory (VRAM), buffer, and graphics engine as desired. The display device 1014 may comprise a liquid-crystal display (LCD), or may comprise alternative type of display technologies, such as a light-emitting diode (LED) display, gas or plasma display, or employ flat-screen technology.

An information handling system 1000 may further include an input/output (I/O) system 1016 for connecting to one or more I/O devices 1018, 1020, and up to N number of I/O devices 1022. Input/output system 1016 may comprise one or more controllers or adapters for providing interface functions between one or more of I/O devices 1018–1022. For example, input/output system 1016 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the information handling system 1000 of FIG. 10 by one having ordinary skill in the art would not depart from the scope or the spirit of the present invention. Thus, the present invention may access functionality from a variety of devices, such as through a network interface 1006, input/output system 1016, and the like.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 1004 of one or more information handling systems configured generally as described in FIG. 1. Until required by the information handling system, the set of instructions may be stored in another readable memory device, for example in a hard disk drive or in a removable medium such as an optical disc for utilization in a CD-ROM drive and/or digital video disc (DVD) drive, a compact disc such as a compact disc-rewriteable (CD-RW), compact disc-recordable and erasable; a floppy disk for utilization in a floppy disk drive; a floppy/optical disc for utilization in a floppy/optical drive; a memory card such as a memory stick, personal computer memory card for utilization in a personal computer card slot, and the like. Further, the set of instructions can be stored in the memory of an information handling system and transmitted over a local area network or a wide area network, such as the Internet, when desired by the user.

Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the adjustable user interface of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of configuring a user interface of an information handling system based on utilization of ports included with the information handling system, comprising the steps of:
    monitoring a plurality of ports included on the information handling system;
    determining utilization by a utilization device of a port of the plurality of ports wherein a plurality of utilization devices are communicatively coupled to respective ports of the plurality of ports; and
    configuring a user-interface operating on the information handling system based on the determined utilization by the devices of the ports of the plurality of ports and on a defined relationship defined between the ports;
    wherein said defined relationship is a priority assigned to at least a portion of the plurality of ports, the priority assigned being utilized to configure the user-interface.

2. The method as described in claim 1, wherein the step of determining utilization by the device of the port includes determining which port of the plurality of ports to which the device is communicatively coupled.

3. The method as described in claim 1, wherein the configuring step includes arranging content displayed on a display device of the information handling system, the content corresponding to devices communicatively coupled to the ports in a manner corresponding to usage by the devices of the ports.

4. The method as described in claim 3, wherein the user-interface is arranged so that content corresponding to a first device and content corresponding to a second device are displayed based upon the ports utilized by the first device and the second device.

5. The method as described in claim 1, further comprising configuring the user-interface based on an output device communicatively coupled to the information handling system.

6. The method as described in claim 1, further comprising configuring the user interface based on applications operating on the information handling system.

7. The method as described in claim 1, wherein the monitored plurality of ports are arranged in at least two groupings, the two groupings being utilized to configure the user interface.

8. The method as described in claim 1 wherein priority is assigned based on temporal considerations wherein the later connected peripheral device is given higher priority than a peripheral device that has already been connected.

9. The method as described in claim 1 wherein priority is assigned using a look up table based on heuristic data.

10. A method of configuring a user interface of an information handling system based on utilization of ports included with the information handling system. comprising the steps of:
monitoring a plurality of ports included on the information handling system;
determining utilization by a utilization device of a port of the plurality of ports wherein a plurality of utilization devices are communicatively coupled to respective ports of the plurality of ports; and
configuring a user-interface operating on the information handling system based on the determined utilization by the devices of the ports of the plurality of ports and on a defined relationship defined between the ports;
wherein the configuring step includes arranging content displayed on a display device of the information handling system, the content corresponding to devices communicatively coupled to the ports in a manner corresponding to usage by the devices of the ports;
wherein said defined relationship is a priority based on the utilized ports and said arranging includes positioning the display of content in the priority based on the utilized ports.

11. A method of configuring a user interface of an information handling system based on utilization of ports included with the information handling system, comprising the steps of:
monitoring a plurality of ports included on the information handling system;
determining utilization by a utilization device of a port of the plurality of ports wherein a plurality of utilization devices are communicatively coupled to respective ports of the plurality of ports; and
configuring a user-interface operating on the information handling system based on the determined utilization by the devices of the ports of the plurality of ports and on a defined relationship defined between the ports;
wherein the defined relationship comprises at least one of (i) an order of priority and (ii) port locations, and wherein the configuring step includes at least one of placing a display of information in an order of priority and displaying information corresponding to the location of the ports corresponding to devices connected to the information handling a system.

12. A method of configuring a user interface of an information handling system based on utilization of ports included with the information handling system, comprising the steps of: monitoring a plurality of ports included on the information handling system;
determining utilization by a first device communicatively coupled to a first port and a second device communicatively coupled to a second port of the plurality of ports; and
configuring a display of a user-interface operating on the information handling system based on the determined utilization of the first port and of the second port, wherein the configuring step includes arranging the user-interface so that content corresponding to the first device and content corresponding to the second device is displayed based upon the ports utilized by the first device and the second device,
said configuring step including at least one of (i) placing a display of information in an order of priority and (ii) displaying information corresponding to the location of the ports corresponding to devices connected to the information handling system.

13. The method as described in claim 12, wherein said arranging includes positioning the display of content in a said priority based on the utilized ports.

14. The method as described in claim 12, wherein the user-interface is arranged so that content corresponding to a first device and content corresponding to a second device is displayed based upon the ports utilized by the first device and the second device.

15. The method as described in claim 12, wherein said priority is assigned to at least a portion of the plurality of ports, the priority being utilized to configure the user-interface.

16. The method as described in claim 12, wherein the first port is located on a front portion of a chassis of the information handling system and the second port is located on a rear-portion of the chassis of the information handling system.

17. The method as described in claim 16, wherein a higher priority is assigned the first port than the second port, the priority utilized to configure the user-interface.

18. The method as described in claim 12, wherein the monitored plurality of ports are arranged in at least two groupings, the groupings being utilized to configure the user interface.

19. An information handling system, comprising:
a plurality of ports suitable for communicatively coupling the information handling system to a device;
a memory suitable for storing a program of instructions;
a display device suitable for outputting a display of information; and
a processor suitable for performing a program of instructions stored in the memory, the processor being communicatively coupled to the plurality of ports, the memory and the display device wherein the program of instruction configures the processor to monitor the plurality of ports so that utilization of the ports by devices is employed to cause the processor to configure a display of a user interface so that content corresponding to each of the devices is arranged based upon which of the ports is utilized by the devices,
the program instruction further including at least one of (i) placing a display of information in an order of priority and (ii) displaying information corresponding to the location of the ports corresponding to devices connected to the information handling system.

20. The information handling system as described in claim 19, wherein the program provides positioning of the display of content in a priority based on the utilized ports.

21. The information handling system as described in claim 19, wherein the user-interface is arranged so that content corresponding to a first device and content corresponding to a second device is displayed based upon the ports utilized by the first device and the second device.

22. The information handling system as described in claim 19, wherein the plurality of ports includes a first port located on a front portion of a chassis of the information handling system and a second port located on a rear-portion of the chassis of the information handling system.

23. The information handling system as described in claim 22, wherein a higher priority is assigned the first port than the second port, and the priority is utilized to configure the user-interface.

24. The information handling system as described in claim 19, wherein the plurality of ports are arranged in at least two groupings, the groupings being utilized to configure the user interface.

25. An information handling system, comprising:
a plurality of ports for coupling the information handling system to at least two peripheral devices;
means for storing a program of instructions; means for displaying an output on a display of the information handling system; and
means coupled to said plurality of ports for processing a program of instructions stored in said storing means, wherein the program of instructions configures said processing means based on utilization of said ports by the at least two peripheral devices, causing said processing means to configure the output of said displaying means so that the output includes content corresponding to a function of at least one of the at least two peripheral devices, and so that said output is arranged in a priority based on the ports utilized by the at least two peripheral devices.

26. A method of configuring a user interface of an information handling system based on utilization of ports included with the information handling system, comprising the steps of:
monitoring a plurality of ports included on the information handling system;
determining utilization by a utilization device of a port of the plurality of ports wherein the utilization device is communicatively coupled to at least said port of the plurality of ports; and
configuring a user-interface operating on the information handling system based on the determined utilization by the device of the port of the plurality of ports,
the plurality of ports including a first port located on a front portion of a chassis of the information handling system and a second port located on a rear portion of the chassis of the information handling system;
wherein a higher priority is assigned the first port than the second port, and the priority is utilized to configure the user-interface.

* * * * *